Figure 1:
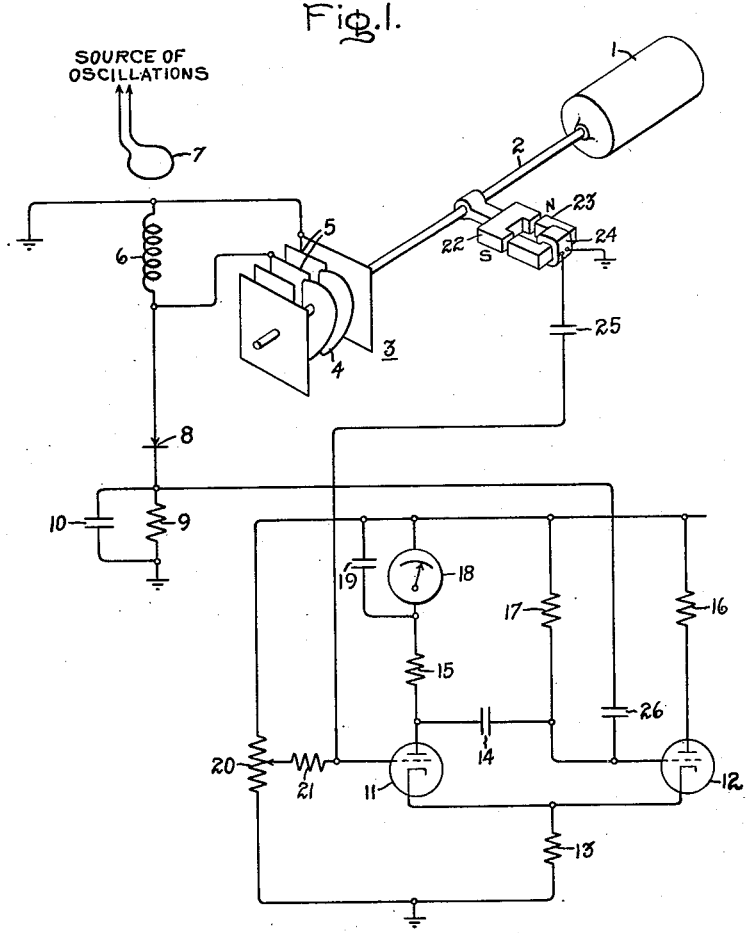

April 8, 1952     A. F. BISCHOFF     2,592,235

FREQUENCY MEASURING INSTRUMENT

Filed July 29, 1950     2 SHEETS—SHEET 1

Inventor:
Alfred F. Bischoff,
by Paul A. Frank
His Attorney.

Patented Apr. 8, 1952

2,592,235

UNITED STATES PATENT OFFICE 2,592,235

FREQUENCY MEASURING INSTRUMENT

Alfred F. Bischoff, Ballston Spa, N. Y., assignor to General Electric Company, a corporation of New York Application July 29, 1950, Serial No. 176,702

5 Claims. (Cl. 250—39)

My inventory relates to frequency measuring instruments and more particularly to electronic circuit arrangements for providing accurate measurement of frequencies throughout a wide band.

An object of my invention is to provide a frequency meter which may be used to measure accurately frequencies which are located within a relatively wide frequency band.

Another object of my invention is to provide a new and improved inexpensive frequency measuring instrument which may be used to measure accurately the frequency of high frequency energy.

According to the illustrated embodiment of my invention, a voltage signal from a source of unknown frequency is coupled to a tuned circuit. The tuned circuit includes an impedance which is cyclically varied at a known rate. When the tuned circuit is resonated to the frequency of the source of oscillations, a voltage signal is derived therefrom. Because the impedance is varied at a known rate, the time between a reference value of impedance and the resonating value of impedance may be used to determine the frequency of the source. In one illustrated embodiment of this invention, the reference value is fixed while in another embodiment the reference value depends upon the frequency of the source. Hereinafter the operation of each of these embodiments is more fully described.

Electrical means comprising a multivibrator circuit with a current indicating device located in the anode circuit of one of the discharge devices therein is used to measure the time duration between the reference value and the resonating value. Of course, for facility in operation this device is directly calibrated in frequency obviating conversion from time lapse to frequency. To preserve a high degree of sensitivity throughout a wide frequency bandwidth, various values of impedance may be used as replacements for the inductor in the tuned circuit.

For further objects and advantages and for a better understanding of my invention, attention is now directed to the following description and accompanying drawing and also to the appended claims. In the drawings, Figs. 1 and 2 are different embodiments of a frequency measuring device constructed according to this invention.

Figure 2:
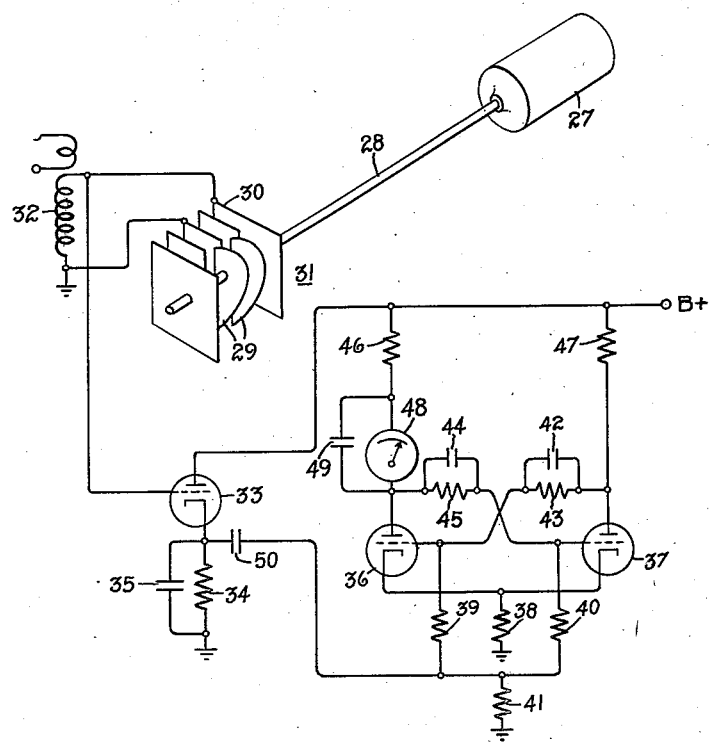

Referring to Fig. 1, a source of rotational power 1, such, for example, as a dynamoelectric machine, rotates a shaft 2 at a known constant rate and cyclically varies the capacitance of a capacitor 3 at a constant rate. Movable plates 4 are mounted on shaft 2 and intermesh with stationary plates 5 in response to rotation of shaft 2. An inductor 6 is connected in parallel relation with capacitor 3 to form a tuned circuit to which a signal from a source of unknown frequency oscillations is coupled. In the drawing the means of coupling the signal from the source of oscillations is shown as a single loop 7 magnetically coupled to inductor 6. One terminal of inductor 6 is grounded and the other terminal is connected through a unidirectional impedance device 8 and a parallel arrangement of a resistor 9 and a capacitor 10 to ground. A pair of electron discharge devices 11 and 12 are each provided with an anode, a cathode and a control electrode. Devices 11 and 12 have a common cathode resistor 13, and a capacitor 14 is connected between the anode of device 11 and the control electrode of device 12. Devices 11 and 12 derive their direct anode voltage through separate anode resistors 15 and 16 from a source of positive voltage (not shown). A resistor 17 is connected between a source of positive voltage and the control electrode of device 12. A direct current indicating instrument 18 which is bypassed by a capacitor 19 is located in the anode circuit of device 11. A potentiometer 20 is connected between the positive terminal of the direct voltage supply and ground, and a variable tap on the potentiometer is connected through a resistor 21 to the control electrode of device 11. A permanent magnet 22 is mounted on shaft 2 such that it rotates about the longitudinal axis of shaft 2 in response to rotation of the shaft. A soft iron core 23 having a coil 24 wound thereon is located with respect to magnet 22 such that magnte 22 passes in close relation to core 23 once during each revolution of shaft 2. One terminal of coil 24 is connected to ground and another terminal is connected through a capacitor 25 to the control electrode of device 11. A capacitor 26 is connected from the junction of impedance 8 and resistor 9 to the control electrode of device 12.

In operation the signal to be measured is coupled to inductor 6 by means of loop 7 or perhaps by disposing inductor 6 directly in the field of the oscillations to be measured. Capacitor 3 is cyclically varied at a constant rate by source 1, and if the impedance of inductor 6 is properly chosen, the tuned circuit will be resonant to the frequency of the source of oscillations twice during each revolution of shaft 2. By properly choosing the direction of winding of coil 24 with respect to the change in flux in iron core 23 as magnet 22 passes nearby, a positive signal of short duration may be supplied to the control electrode of device 11. In the absence of this positive signal, the multivibrator circuit rests in a steady-state condition with device 12 conducting due to the positive biasing voltage supplied to its control electrode through resistor 17 and with device 11 non-conducting due to its high positive cathode voltage developed across resistor 13 by the anode circuit current of device 12. When device 11 is made conducting by the positive signal induced in core 24, its anode voltage decreases which decreases the voltage on the control electrode of device 12 cutting off anode current flow of device 12 which had formerly been conducting. After the pulse of voltage from coil 24 has passed, the increased anode current of device 11 remains constant until conduction in device 11 is extinguished when device 12 is again made conducting in the manner described hereinafter. Instrument 18, therefore, indicates exactly the average anode current of device 11 during the time between conduction of device 11 and conduction of device 12. The time at which device 12 is again made conductive is determined by the time at which the capacitance of capacitor 3 is such as to resonate the tuned circuit to the frequency of the source of oscillations. A pulse of current is produced by the tuned circuit which is rectified by impedance 8 and which produces a voltage drop across resistor 9 applied as a positive voltage pulse to the grid of device 12 to cause device 12 to conduct. When device 12 conducts, its anode current flows through resistor 13 causing a high positive voltage to be impressed upon the cathode of device 11 causing device 11 to cut off. It will be appreciated that device 12 would eventually conduct even without the positive grid voltage pulse since the negative pulse previously impressed upon the control electrode of device 12 through coupling capacitor 14 by the initial conduction of device 11 is gradually dissipated by resistor 17, charging capacitor 14 until the grid of device 12 is brought into the conduction range for device 12. By proper choice of the time constant composed of resistor 17 and capacitor 14, however, the time required for this normal firing is made greater than that time required for one revolution of shaft 2. Consequently, before one revolution of shaft 2 is complete, capacitor 3 will resonate with coil 6 to the frequency of the source of oscillations causing a voltage to be generated across the parallel combination which is rectified by impedance 8 and applied across resistor 9. Capacitor 10 is a small capacitor used to store the alternating frequency pulses and produce a single positive pulse which is applied to the grid of device 12 by capacitor 26. This pulse causes device 12 to begin conduction. The anode current of device 12 flowing through resistor 13 causes device 11 to cut off and return to its original state. A second positive impulse, derived from capacitors 3 and coil 6 when the capacitor plates 4 unmesh and return to their original position, is applied to the grid of device 12 but has no effect because device 12 is already in the conducting state. Device 11 remains in the non-conducting state until magnet 22 again passes core 23 supplying a positive pulse to the control electrode of device 11 and again commencing the cycle. Capacitor 3 is varied at a rate such that the frequency of the variable component in the anode circuit of device 11 is high enough to prevent the pointer of instrument 18 from following the individual variations in anode current and indicate an average current flow.

Electron discharge device 11 conducts a constant current during the time it is in a conducting state, and, consequently, the indication of instrument 18 is dependent upon the time of conduction of device 11 and hence, upon the time lapse between the reference signal from winding 24 and the resonating of the tuned circuit to the frequency of the source of oscillations. The rate at which capacitor 3 is varied being constant, instrument 18 may be calibrated directly in frequency, and various calibrations may be made for different values of inductance for inductor 6.

Referring to Fig. 2, a dynamoelectric machine 27 rotates a shaft 28 to which are attached a plurality of movable capacitor plates 29. These movable blades are rotated by shaft 28 and intermesh with stationary blades 30 of a variable capacitor 31. An inductor 32 is connected across capacitor 31 such that a resonant tank circuit is formed to which a signal from an unknown source of oscillations is coupled. When the tank circuit is resonated to the frequency of the source of oscillations, a large voltage appears across the tank circuit and is coupled to the control electrode of an electron discharge device 33. The cathode of device 33 is connected to ground through a parallel connection of a resistor 34 and a capacitor 35. The anode of device 33 is connected to a source of direct potential. A pair of electron discharge devices 36 and 37 are connected in a multivibrator circuit and both devices have a common cathode resistor 38. The control electrodes of these devices are connected to ground through a pair of grid leak resistors 39 and 40 and a resistor 41. The control electrode of device 36 is connected to the anode of device 37 through a parallel combination of a capacitor 42 and a resistor 43. The control electrode of device 37 is connected to the anode of device 36 through a parallel combination of a capacitor 44 and a resistor 45. Load resistors 46 and 47 are connected in the anode circuits of devices 36 and 37 respectively, and a current indicating instrument 48 bypassed by a capacitor 49 is connected in the anode circuit of device 36. A capacitor 50 is interconnected between the cathode of device 33 and the junction of resistors 39 and 40 and 41.

Capacitor 31 is designed such that the change in frequency of the tuned circuit is approximately linear with rotation of shaft 2, and the rotational angle required for plates 29 to unmesh and return to start is minimized. Thus, the shaft angular position for the return resonance can be made small for a wide band of frequencies.

The resonant voltage generated across the resonant circuit composed of capacitor 31 and inductor 32 is impressed upon the grid of device 33, which is known in the art as an infinite impedance detector. This detector converts the alternating voltage applied to its grid into a unidirectional positive pulse which appears across its cathode resistor 34 and is filtered by capacitor 35. This positive impulse is coupled to the control electrodes of devices 36 and 37 which together constitute the familiar Eccles-Jordan circuit.

As an example of the operation of this circuit, assume that device 37 is conducting, that device 36 is cut off, and also that capacitor 31 is just beginning the return sweep. As resonance of inductor 32 and capacitor 31 occurs during the return sweep, an alternating voltage is built up across the resonant circuit which causes device 33 to generate a positive pulse on its cathode which is applied to the control electrodes of devices 36 and 37. This causes device 36 to become conducting and device 37 is cut off. Consequently, anode current begin to exist in instrument 48 and charges up capacitor 49. Devices 36 and 37 remain in this state until capacitor 31 again resonates with inductor 32 during its forward sweep to cause device 33 to apply a second positive impulse to the control electrodes of devices 36 and 37 causing device 36 to cut off and device 37 to conduct, thus returning the combination to its original state.

The anode current of device 36 as indicated by the averaging instrument 48 is a direct measure of the time interval between the return sweep resonance and the forward sweep resonance. Meter 48 is accordingly directly calibrated in frequency.

While this invention has been described by particular embodiments thereof it will be understood that this is by way of illustration only and that those skilled in the art may make many changes and modifications without departing from the invention. Therefore by the appended claims I intend to cover all such changes and modifications which fall within the true spirit and scope of this invention.

What I claim as new and desire to secure by Letters Patent of the United States is:

1. An instrument for measuring the frequency of a source of alternating electric energy, comprising a resonant circuit including a variable impedance, said resonant circuit being adapted to be coupled to the source of electric energy, a motor having a shaft connected to vary said impedance at a known rate, a permanent magnet mounted on said shaft, a ferromagnetic material having a coil wound thereon located such that said magnet passes in close relation thereto at a predetermined position of said shaft, means connected to said resonant circuit for providing a voltage pulse whenever said circuit is tuned to the frequnecy of a source of electric energy coupled thereto, and electric means indicating the time interval between the time that a current is induced in said coil when said magnet passes in close relation to said ferromagnetic material and the time of occurrence of said voltage pulse.

2. A frequency measuring device comprising a resonant circuit including a variable capacitor, means cyclically varying the capacitance of said capacitor at a constant rate, first and second electron discharge devices, each of said devices being provided with an anode, a cathode and a control electrode, said devices having a common cathode resistor, and a capacitor connecting the anode of said second device to the control electrode of said first device, a direct current indicating instrument located in the anode circuit of said second device, a unidirectional impedance interconnected between said resonant circuit and the control electrode of said first device for supplying a voltage pulse to said first device responding to a condition of resonance in said resonant circuit to a frequency being measured, and pulse producing means responsive to said cyclical capacitance varying means for supplying a positive impulse of voltage to the control electrode of said second device whenever the capacitance of said capacitor is at a determinable value.

3. In a frequency meter a resonant circuit having an inductor and a variable capacitor connected in parallel relationship, a constant speed motor varying said variable capacitor at a constant rate, a magnet located on the shaft of said motor, an iron core having a coil wound thereon located at a position such that said magnet passes close to said core once during each revolution of the shaft of said motor, a one-shot multivibrator circuit provided with a pair of electron discharge devices, a direct current meter located in the anode circuit of one of said devices, said coil being serially connected to the control electrode of the device having said meter connected in the anode circuit thereof for energizing conduction in said one device whenever said magnet passes close to said core, and a unidirectional impedance device connected between said resonant circuit and the control electrode of said other device for providing a voltage pulse to said other device to extinguish conduction in said one device whenever said resonant circuit is tuned to a frequency being measured.

4. An instrument for measuring the frequency of a source of alternating electric energy, comprising a resonant circuit arrangement including a variable impedance, said resonant circuit being coupled to the source of electric energy, a device for varying cyclically said impedance at a known rate so that two resonances to the frequency of the source are encountered for each complete cycle of operation of the variable impedance, and electrical means for measuring the time interval between the said two resonances.

5. An instrument for measuring the frequency of a source of alternating electric energy, comprising a resonant circuit arrangement including a variable impedance, said resonant circuit being coupled to the source of alternating electric energy, a device for varying cyclically said impedance at a known rate, and electrical means for measuring the time interval between a reference value of said impedance and a resonant value of said impedance occurring during each cycle of impedance variation.

ALFRED F. BISCHOFF.

REFERENCES CITED

The following references are of record in the file of this patent:

UNITED STATES PATENTS

| Number | Name | Date |
| --- | --- | --- |
| 2,084,760 | Beverage | June 22, 1937 |
| 2,200,103 | Shutt | May 7, 1940 |
| 2,370,692 | Shepherd | Mar. 6, 1945 |